(12) United States Patent
Wang et al.

(10) Patent No.: US 7,190,576 B2
(45) Date of Patent: Mar. 13, 2007

(54) INTERNALLY DISPOSED COOLING DEVICE FOR ELECTRONIC APPARATUS

(75) Inventors: Jack Wang, No. 2, Ta-Chih Rd., Taoyuan City 330, Taoyuan (TW); Charles Ma, Taoyuan (TW); Michael Lin, Taoyuan (TW)

(73) Assignees: Waffer Technology Corp., Taoyuan (TW); Jack Wang, Taoyuan (TW)

( * ) Notice: Subject to any disclaimer, the term of this patent is extended or adjusted under 35 U.S.C. 154(b) by 358 days.

(21) Appl. No.: 10/871,595

(22) Filed: Jun. 21, 2004

(65) Prior Publication Data

US 2005/0281016 A1    Dec. 22, 2005

(51) Int. Cl.
- H05K 7/20 (2006.01)
- H01L 23/38 (2006.01)
- F25B 21/02 (2006.01)

(52) U.S. Cl. .................. 361/687; 361/695; 257/930; 257/E23.082; 62/3.2

(58) Field of Classification Search ................ 361/687, 361/695; 257/722, 930, E23.082; 62/3.2
See application file for complete search history.

(56) References Cited

U.S. PATENT DOCUMENTS 5,419,780 A * 5/1995 Suski ......................... 136/205
6,173,576 B1 * 1/2001 Ishida et al. .................. 62/3.7
6,438,984 B1 * 8/2002 Novotny et al. ............. 62/259.2
6,587,343 B2 * 7/2003 Novotny et al. ............. 361/698
6,826,456 B1 * 11/2004 Irving et al. ................. 700/299
2002/0134087 A1 * 9/2002 Urch ............................ 62/3.2

FOREIGN PATENT DOCUMENTS

| TW | 505378 | 10/2002 |
|---|---|---|
| TW | 526959 | 4/2003 |

* cited by examiner

Primary Examiner—Anatoly Vortman (57) ABSTRACT

An internally disposed cooling device is provided. The cooling device includes a cooling member and a docket member. The cooling member includes a first cooling unit, a second unit and a cryogenic element. The cryogenic element has a cold surface that contacts the first cooling unit, and a hot surface that contacts the second cooling unit. Since the cold surface of the cryogenic element has a temperature much lower than that of the room temperature, the first cooling unit can thus produce cold and dry air to cool down the electronic apparatus. Meanwhile, the second cooling unit is employed to dissipate heat generated from the cryogenic element.

2 Claims, 10 Drawing Sheets

INTERNALLY DISPOSED COOLING DEVICE FOR ELECTRONIC APPARATUS

BACKGROUND OF THE INVENTION

The present invention relates generally to an internally disposed cooling device, and more particularly to an internally disposed cooling device that is installed in an electronic apparatus.

Modern electronic apparatuses, such as computer mainframes and communication devices, contain various high-speed computation elements. Since the electronic apparatus is mostly enclosed in a housing, the heat generated by the computation elements of the electronic apparatus is easily accumulated in the housing, thereby the temperature in the housing will increase. Under such a high temperature environment, the electronic apparatus is likely to generate erroneous results or be damaged. Therefore, a cooling device is usually needed in the electronic apparatus, so as to decrease the temperature therein.

The most commonly way for cooling an electronic apparatus is installing a cooling fan on the housing of the electronic apparatus. The cooling fan guides the external air into the housing, thus reduces the temperature in the housing. However, in this way, only external air at a room temperature is guided into the electronic apparatus. However, since room temperature in summer time can be as high as 35° C., it is often not cool enough for cooling the electronic apparatus. Therefore, regardless of how many cooling fans are installed, the heat in the housing of the electronic apparatus is still not effectively dissipated. In addition, the housing of the electronic apparatus can not provide enough space for installation of so many cooling fans either.

Various conventional cooling devices used for a computer mainframe have been disclosed. For example, two Taiwanese patents publication no. 505378 and no. 526959, disclose a removable cooling device disposed in one slot of the computer case for a hard disk drive or an optical disk drive. However, many modern computer systems such as barebone systems include at most two slots for installing a hard disk drive and an optical disk drive. Therefore, there is often no extra slot for disposing such kind of cooling devices. The conventional cooling devices disclosed in the patents mentioned above can not be adapted for modern computer systems.

BRIEF SUMMARY OF THE INVENTION

The present invention is to provide an internally disposed cooling device that can reduce the temperature in the housing of an electronic apparatus.

Further, the present invention is to provide an internally disposed cooling device that has a cryogenic element. The cooling device dissipates heat in the housing of the electronic apparatus, as well as heat generated from the cryogenic element.

Accordingly, the cooling device of the present invention includes a cooling member and a docket member. The cooling member includes a first cooling unit, a second cooling unit and a cryogenic element. The cryogenic element includes a cold surface and a hot surface, wherein the cold surface has a temperature much colder than that of the room temperature, and the heat generated from the cryogenic element is dissipated via the hot surface. The docket member includes a top wall and a plurality of side walls. The top wall has a hole formed at the central portion thereof for disposing the cryogenic element of the cooling member. The top wall and the side walls defines an air passageway. The first cooling unit couples the second cooling unit, thereby sandwiching the top wall and the cryogenic element therebetween. Consequently, the first cooling unit contacts the cold surface, while the second cooling unit contacts the hot surface. Furthermore, a first cooling fan can be disposed corresponding to the first cooling unit, thereby producing cold air for cooling the electronic apparatus. Likewise, a second cooling fan can be disposed corresponding to the second cooling unit, thereby maintaining the cryogenic element operating under working temperature.

DETAILED DESCRIPTION OF THE INVENTION

Figure 1:
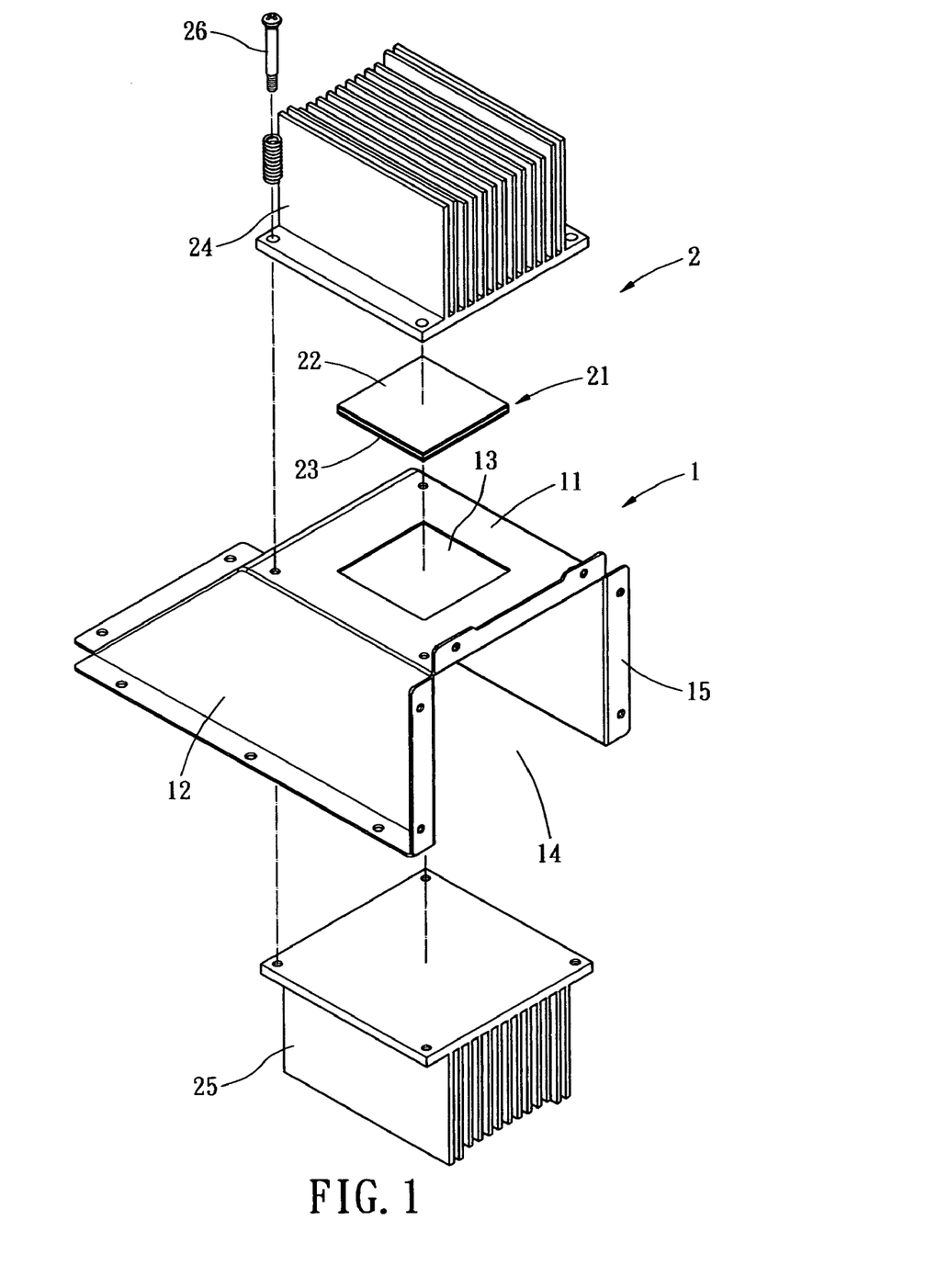
FIG. 1 illustrates an explosive view of a cooling device in accordance with the first embodiment of the present invention.
Figure 2:
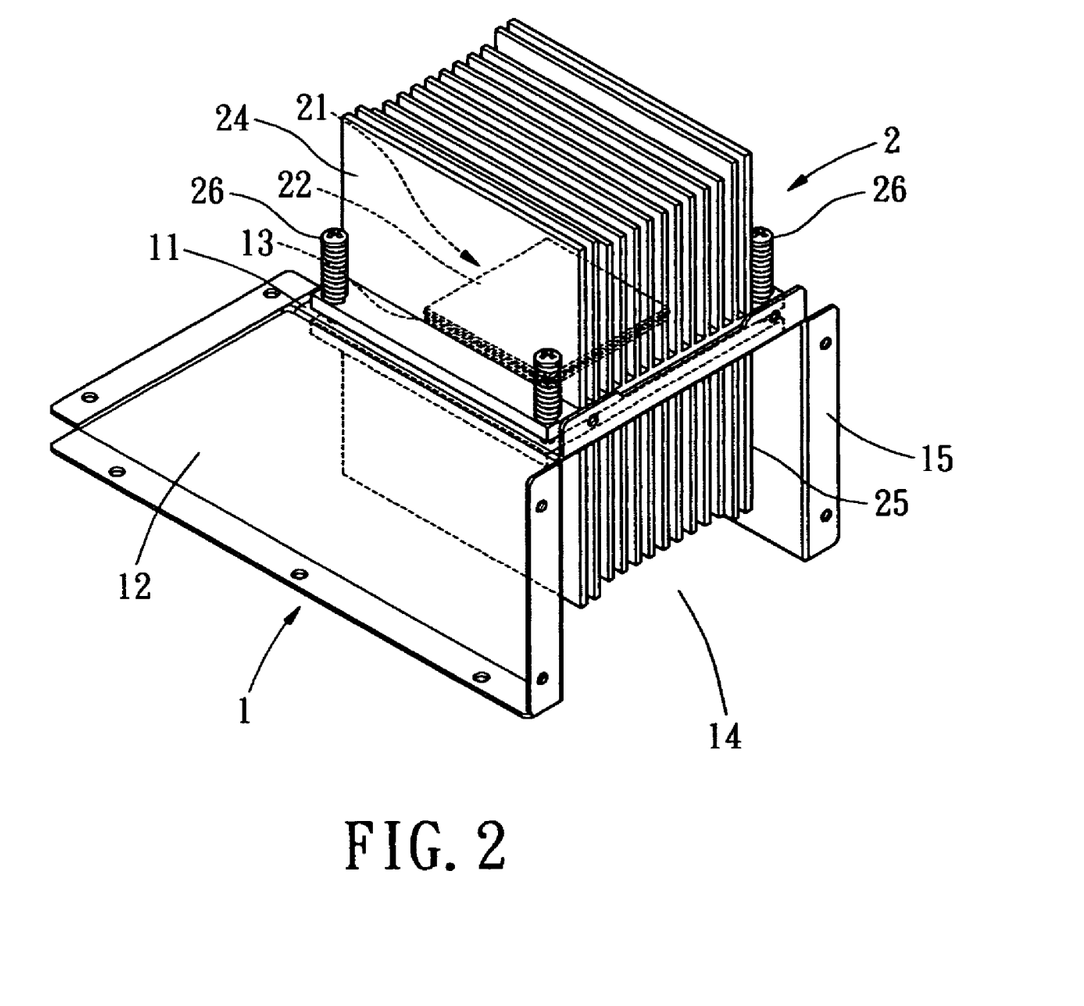
FIG. 2 illustrates a perspective view of the cooling device in accordance with the first embodiment of the present invention.

Referring first to FIG. 1 to FIG. 6, an internally disposed cooling device in accordance with the first embodiment of the present invention is illustrated. As shown in FIG. 1 and FIG. 2, the cooling device includes a docket member 1 and a cooling member 2. The cooling member 2 includes a first cooling unit 24, a second cooling unit 25 and a cryogenic element 21. In this particular embodiment, the first and the second cooling units 24, 25 are cooling fin sets, as shown in FIG. 1 and FIG. 2. The cryogenic element 21 includes a cryogenic chip, which includes a cold surface 22 that contacts the first cooling unit 24, and a hot surface 23 that contacts the second cooling unit 25. The docket member 1 including a top wall 11 and a plurality of side walls 12. An opening 13 is formed at the central portion of the top wall 11 for disposing the cryogenic element 21 of the cooling member 2. The top wall 11 and the side walls 12 define an air passageway 14. In addition, the top wall 11 and the side walls 12 each comprises at least a protrusive portion 15. The protrusive portions 15 are used for installing the cooling device in an electronic apparatus. The first cooling unit 24 and the second cooling unit 25 are firmly coupled to each other by means of a plurality of screws 26, thereby sandwiching the top wall 11 and the cryogenic element 21 therebetween.

Figure 3:
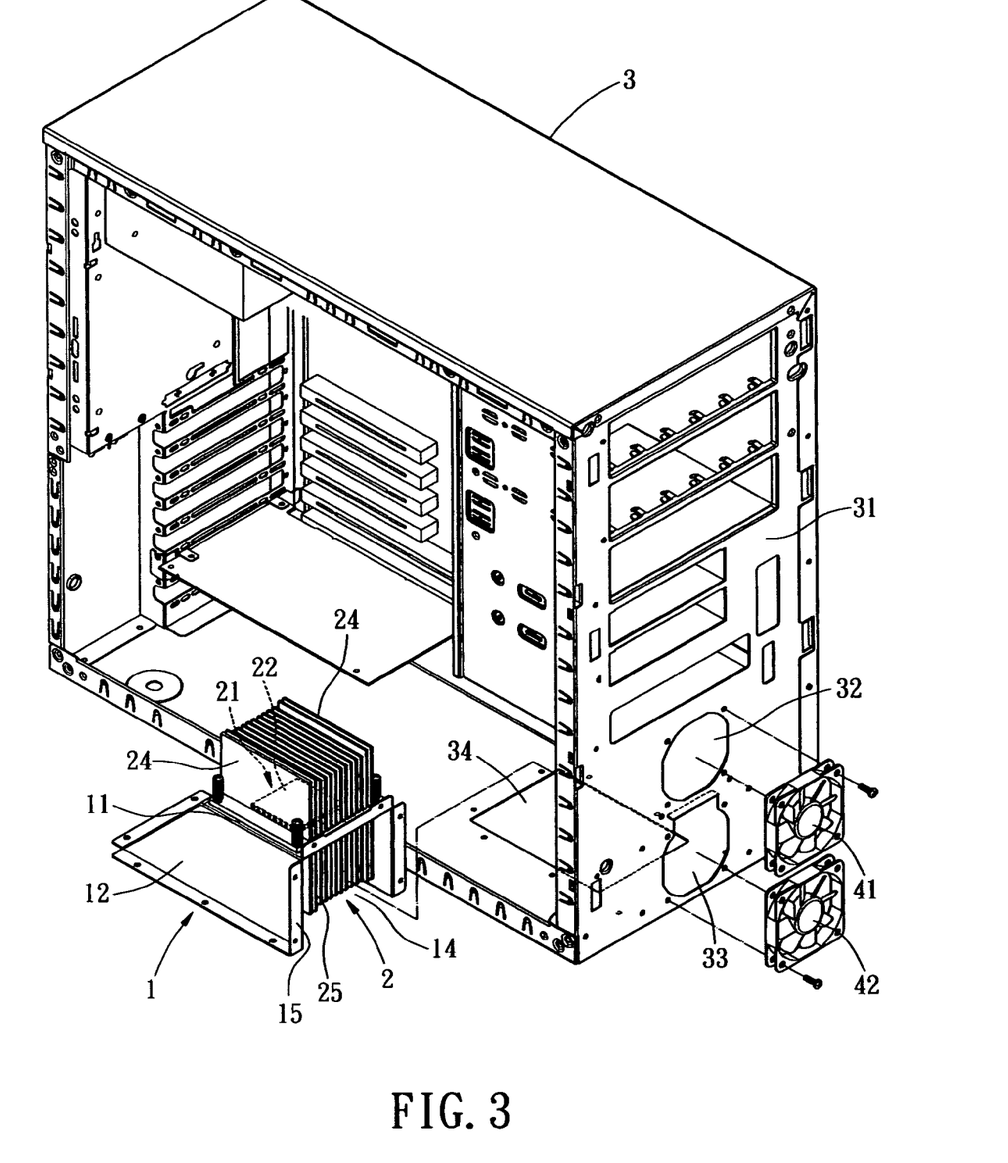
FIG. 3 illustrates an explosive view of an electronic apparatus including the cooling device, in accordance with the first embodiment of the present invention.
Figure 4:
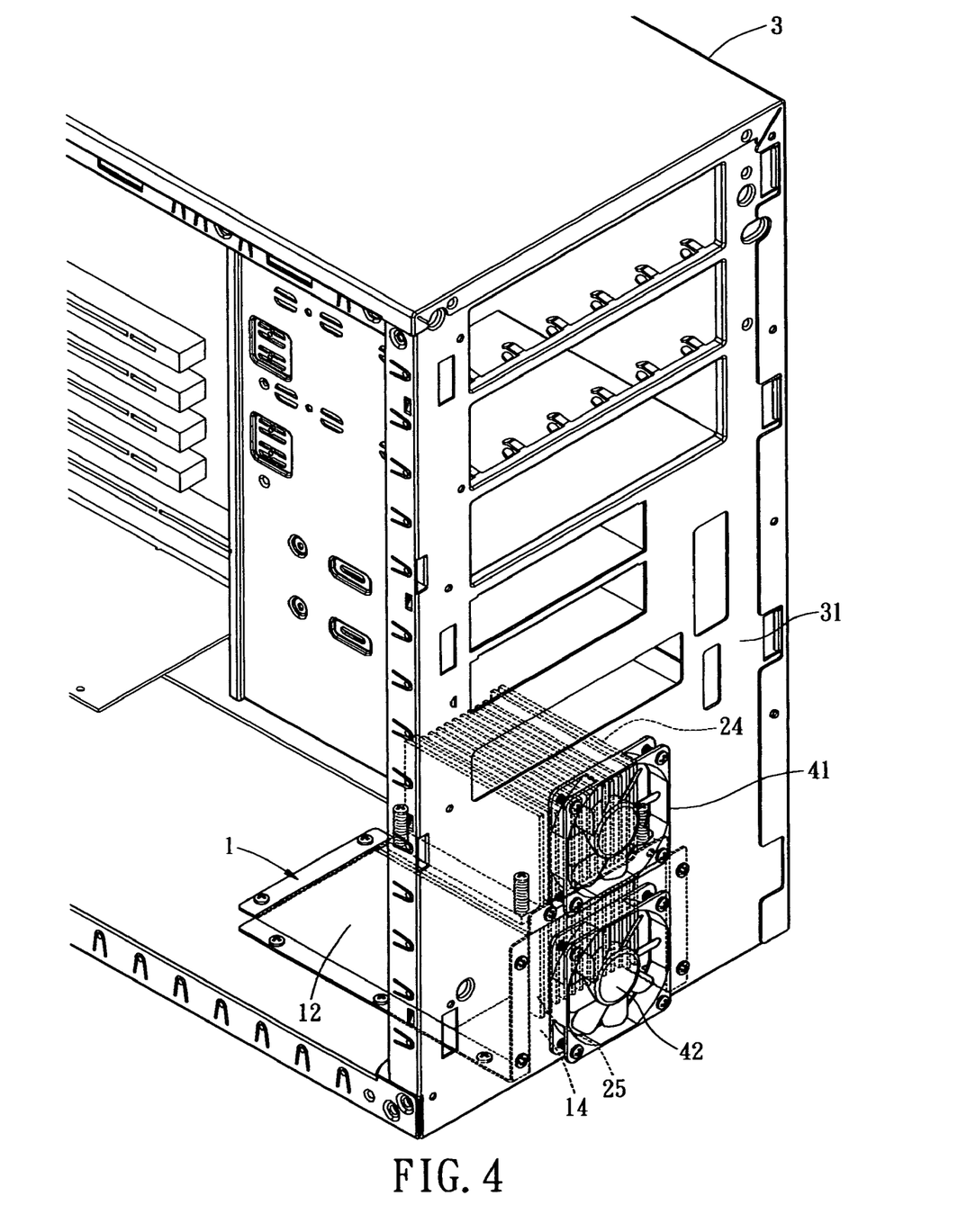
FIG. 4 illustrates a perspective view of an electronic apparatus including the cooling device, in accordance with the first embodiment of the present invention.

Referring to FIG. 3 and FIG. 4, an electronic apparatus 3 having the cooling device of the present invention is illustrated. As shown, the electronic apparatus 3 includes a housing 31 containing a plurality of computation elements. The housing 3 includes a first air intake 32, a second air intake 33 and a hot air exhaustion hole 34. When installing the cooling device in the housing 31 of the electronic apparatus 3, the first cooling unit 24 of the cooling device is arranged to correspond the first air intake 32. The second cooling unit 25 of the cooling device is arranged to correspond the second air intake 33. In addition, the exit of the air passageway 14 is arranged to correspond the air exhaustion hole 34. Here, the exit of the air passageway 14 means an opening that directs air to flow outward. Furthermore, a first cooling fan 41 is installed on the housing 31 corresponding to the first air intake 32, while a second cooling fan 42 is installed on the housing corresponding to the second air intake 33.

Figure 5:
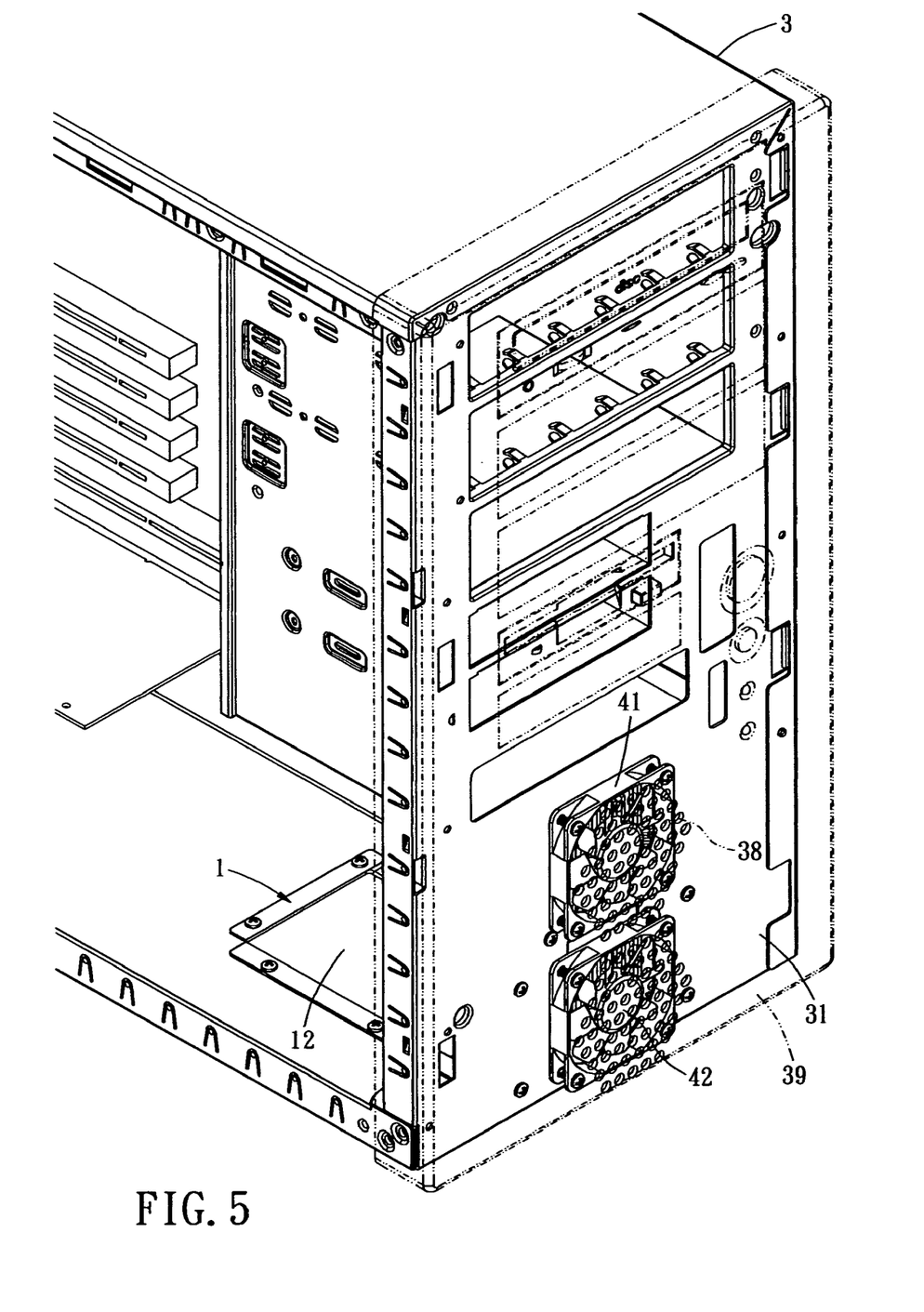
FIG. 5 illustrates a perspective view of an electronic apparatus including the cooling device and a cover plate, in accordance with the first embodiment of the present invention.

Referring to FIG. 5, the electronic apparatus 3 including the cooling device and a cover plate 39 is illustrated. The cover plate 39 includes a plurality of holes 38 corresponding to the first cooling fan 41 and the second cooling fan 42, thereby allowing air to be directed into the housing 31.

Figure 6:
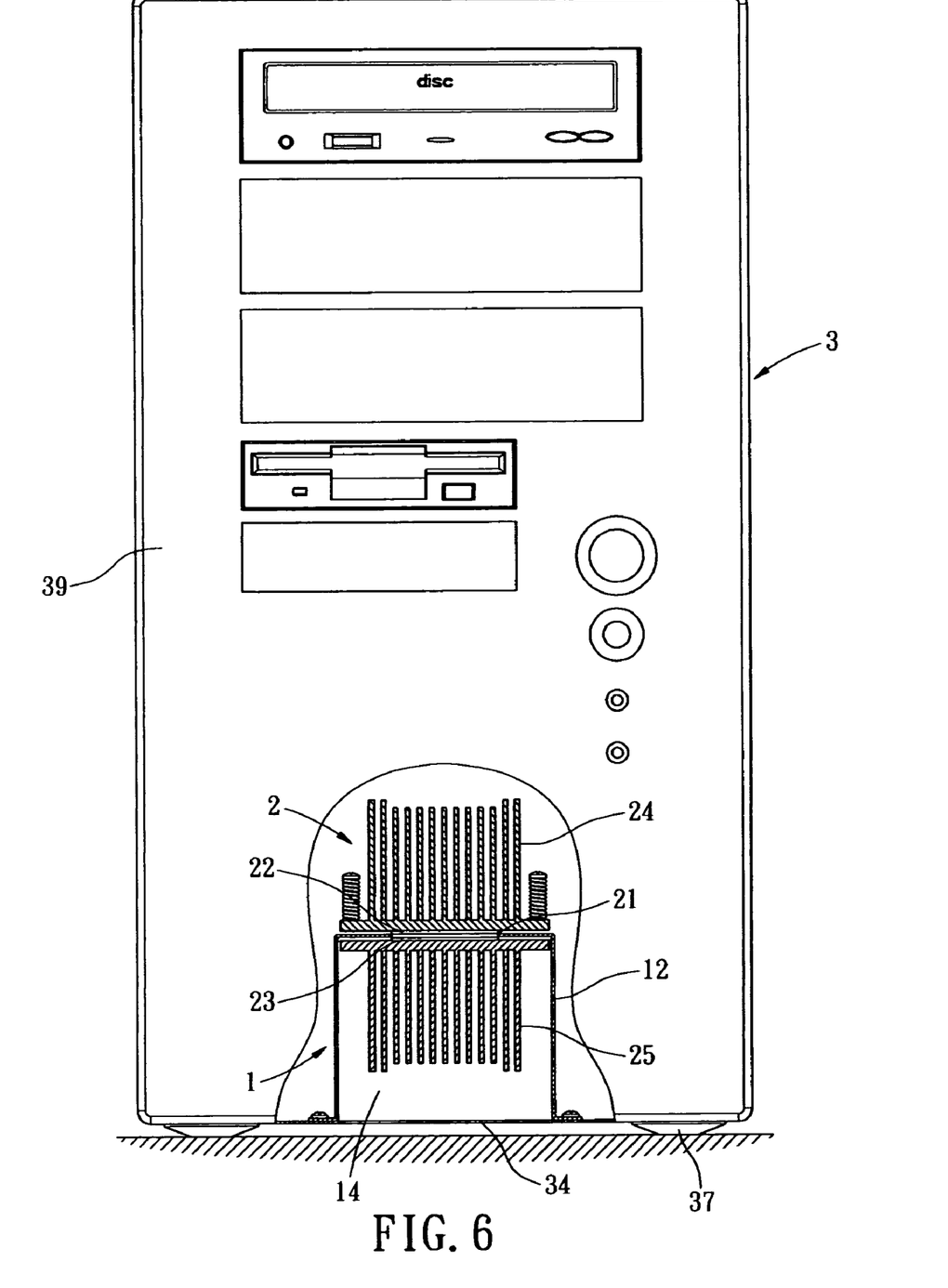
FIG. 6 illustrates a sectional view of the electronic apparatus, in accordance with the first embodiment of the present invention.

Referring to FIG. 6, a sectional view of the electronic apparatus 3 in accordance with the first embodiment of the present invention is illustrated. As shown, the electronic apparatus 3 includes a plurality of pads 37 disposed on the bottom of the housing 31. The pads 37 elevate the electronic apparatus 3, leaving a space for the hot air exhaustion hole 34 to direct air outward.

Figure 7:
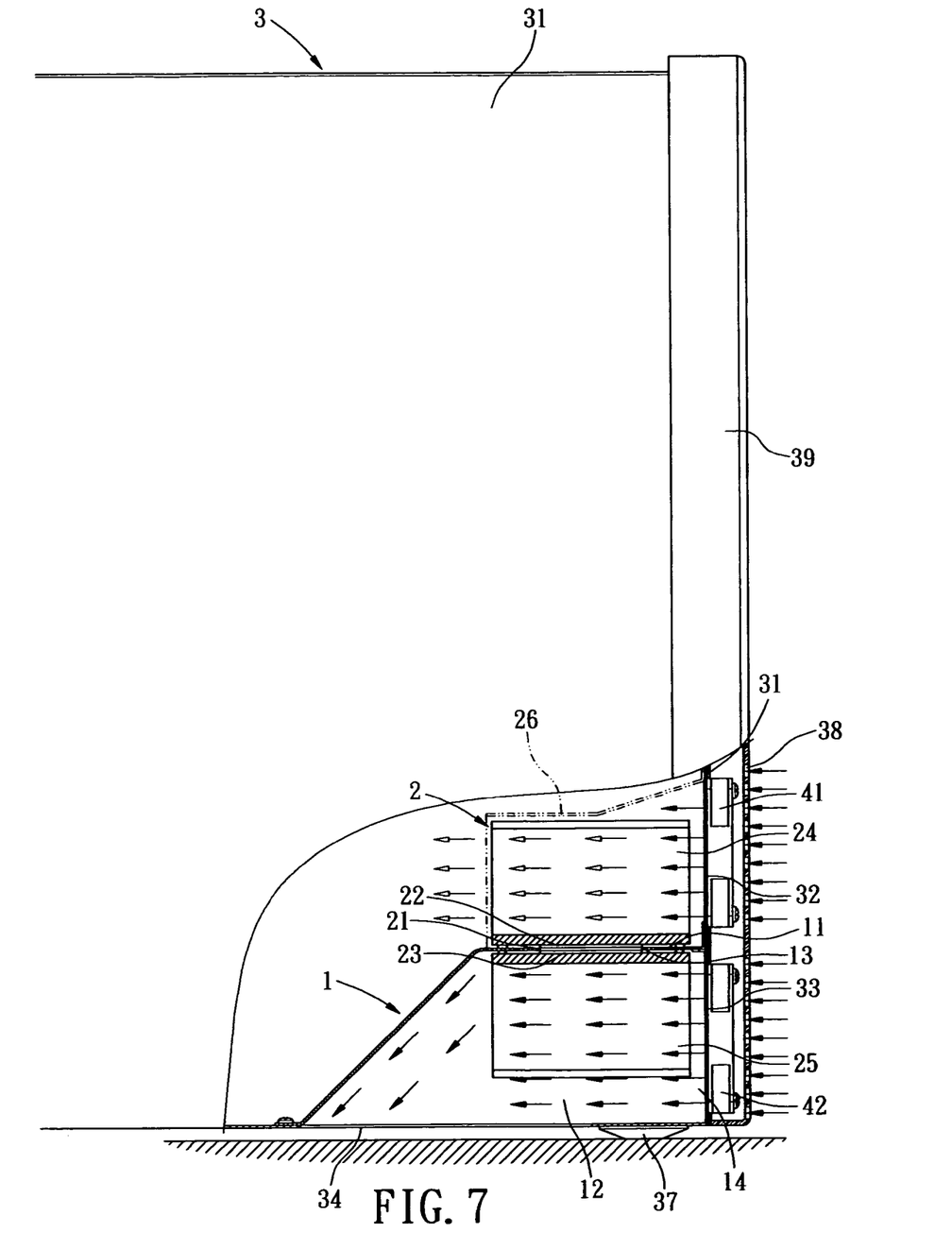
FIG. 7 schematically illustrates the operation of the cooling device in accordance with the first embodiment of the present invention.

Referring to FIG. 7, the operation of the cooling device in accordance with the first embodiment of the present invention is illustrated. As shown, the first cooling fan 41 directs air having room temperature from the environment into the housing 31. The air then flows through the first cooling unit 24. Since the first cooling unit 24 contacts the cold surface 22 of the cryogenic element 21, the temperature of the cooling unit 24 is much lower than that of the air. After flowing through the first cooling unit 24, the air becomes cold and dry that can effectively cool the electronic apparatus. Although the cryogenic element 21 provides a cold surface 22 that is much colder than the room temperature, it generates heat at the hot surface 23. Therefore, the heat generated from the dissipating surface 23 of the cryogenic element 21 is transferred to the second cooling unit 25 that contacts the hot surface 23. By directing air using the second cooling fan 42 to the second cooling unit 25, the second cooling unit 25 is cooled, thereby maintaining the cryogenic chip operating under a working temperature.

Figure 8:
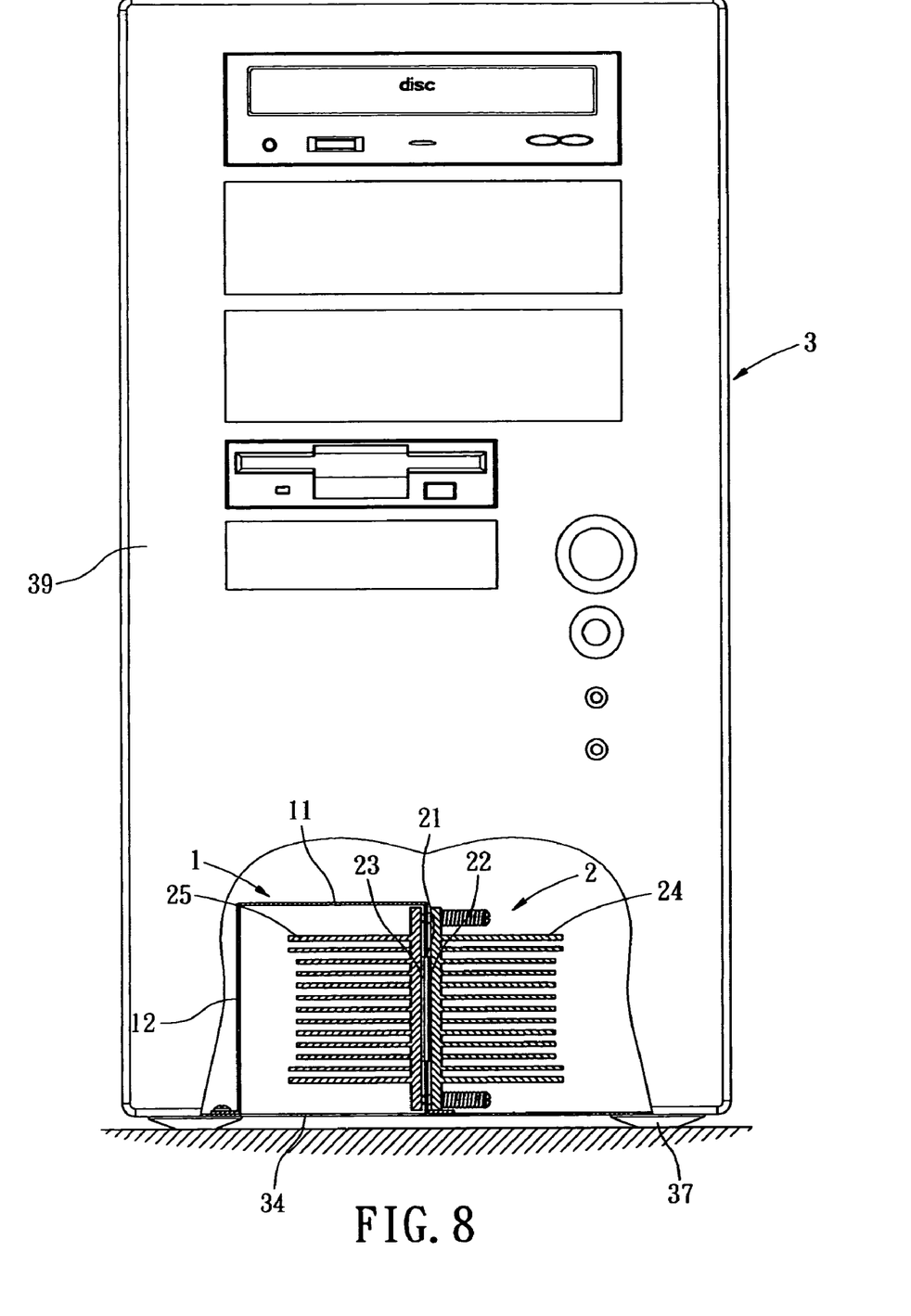
FIG. 8 illustrates a sectional view of an electronic apparatus, in accordance with the second embodiment of the present invention.

Referring to FIG. 8, a sectional view of an electronic apparatus 3 in accordance with the second embodiment of the present invention is illustrated. As shown, a cooling device is installed in the electronic apparatus 3. In this particular embodiment, the cooling device is rotated clockwise by ninety degrees. Although the arrangement of the cooling device in the second embodiment is different from that of the first embodiment, other particular features and functions are substantially the same.

Figure 9:
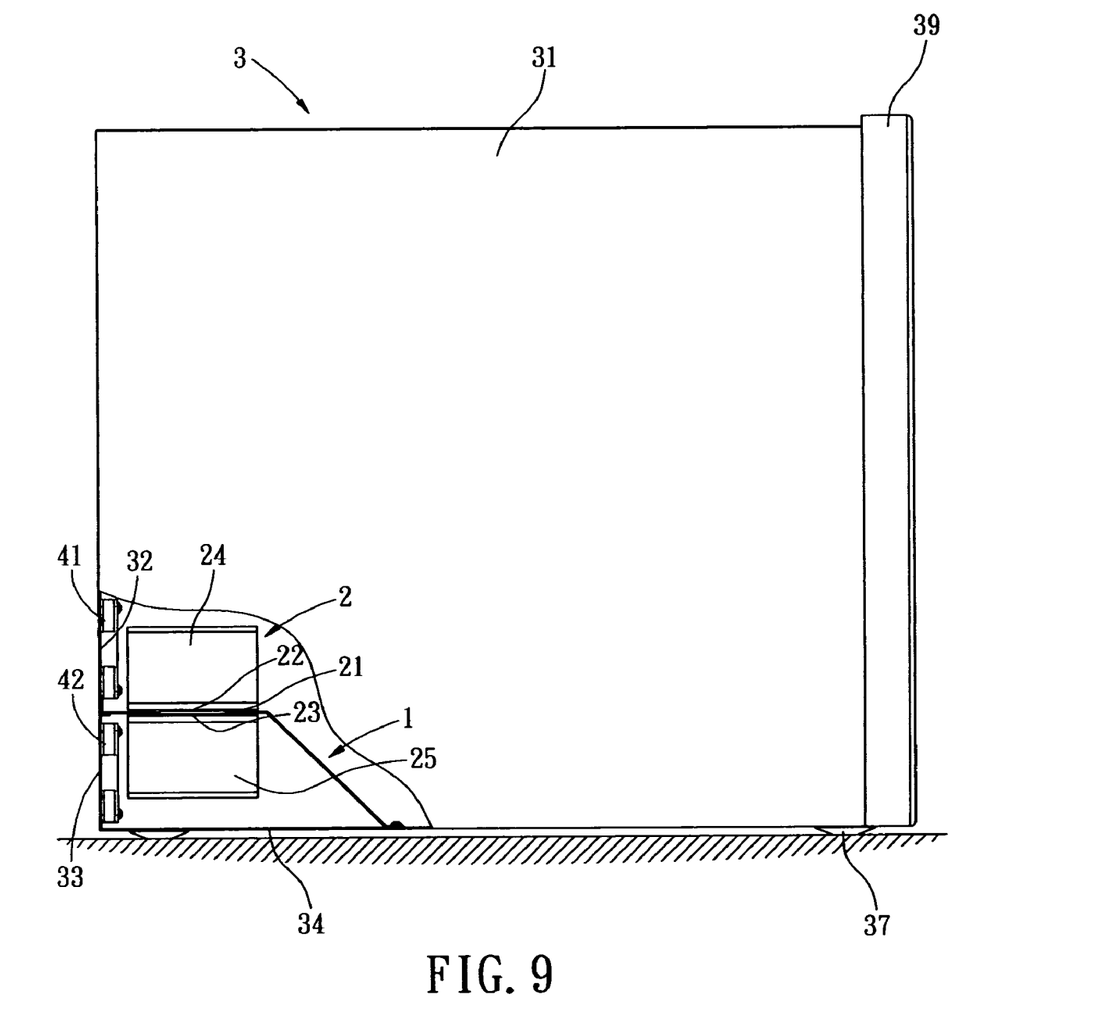
FIG. 9 schematically illustrates the cooling device installed in another position of the electronic apparatus.

Referring to FIG. 9, the cooling device installed in another position of the electronic apparatus is schematically illustrated. As shown, the cooling device is installed at the rear portion of the electronic apparatus 3. Although, two possible positions for installing the cooling device have been illustrated and described, it is appreciated that other positions can still be possible to install the cooling device.

Figure 10:
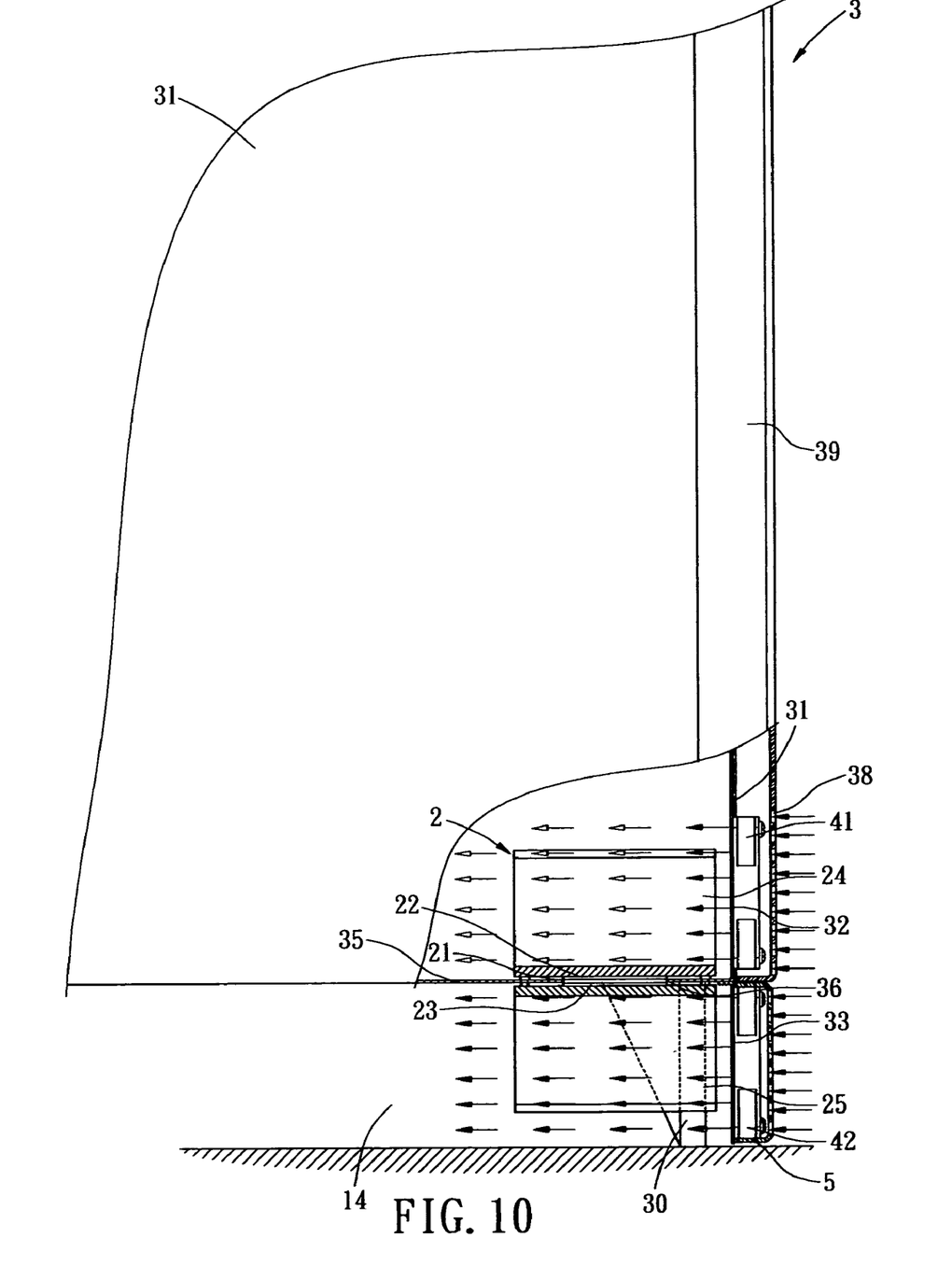
FIG. 10 illustrates a sectional view of a cooling device in accordance with the third embodiment of the present invention.

Referring to FIG. 10, a sectional view of an electronic apparatus 3 having a cooling device, in accordance with the third embodiment of the present invention, is illustrated. As shown, a stand 30 supports and elevates the electronic apparatus 3, so as to form a free space below the base 35 of the housing 31. The free space is used for defining an air passageway 14. A hole 36 is formed on the base 35 for directly installing the cooling unit 2 thereon, so as to separate the cold surface 22 and the hot surface of the cooling unit 2. Furthermore, a first air intake 32 is formed on the housing 31 of the electronic apparatus corresponding to the position of the cold surface 22 of the cooling unit 2. A second air intake 33 is formed on a decorative front cover 5 corresponding to the air passageway 14, wherein the hot surface 23 of the cooling unit 2 is disposed. Consequently, the second cooling unit 25 of the cooling device is disposed completed outside of the housing 31 of the electronic apparatus. The heat generated from the cryogenic chip 21 can thus be dissipated through the second cooling unit 25 without directing the air into the housing 31 of the electronic apparatus 3.

Although the present invention has been described in detail as set forth above, the genuine scope of the present invention is not limited thereto. Since, any person having ordinary skill in the art may readily find various equivalent alterations or modifications in light of the features as disclosed above, it is appreciated that the scope of the present invention is defined in the following claims. Therefore, all such equivalent alterations or modifications without departing from the subject matter as set forth in the following claims is considered within the spirit and scope of the present invention.

What is claimed is:

1. An electronic apparatus, comprising:
   a housing containing a plurality of computation elements, said housing having at least an air intake and an exhaustion hole;
   a cooling device installed in said housing, wherein said cooling device comprises:
     a cooling member including a first cooling fin set, a second cooling fin set and a cryogenic element, wherein said cryogenic element comprises a cryogenic chip with a cold surface contacting said first cooling fin set and a hot surface contacting said second cooling fin set; and
     a docket member including a top wall and a plurality of side walls, said top wall having a hole formed at the central portion thereof for disposing said cryogenic element, said top wall and the side walls defining an air passageway and said second cooling fin set being located inside the air passageway and said first cooling fin set being located outside the air passageway; wherein a protrusive portion is respectively formed on said top wall and said side walls for affixing said cooling device on said housing to have the air passageway connected with the exhaustion hole;
   a first cooling fan disposed on said housing corresponding to said first cooling fin set and blowing air via the air intake to pass through the first cooling fin set so that cooler air is directed into said housing; and
   a second cooling fan disposed on said housing corresponding to said second cooling fin set and blowing air into the air passageway via the air intake so that the air is directed through the second cooling fin set to take away heat out of the passageway via the exhaustion hole.

2. The electronic apparatus as recited in claim 1, further comprising a cover plate covering the front surface of said housing, said cover plate including a plurality of holes formed corresponding to said first cooling fan and said second cooling fan, thereby allowing air to be directed into said housing.

* * * * *